(12) United States Patent
Tatura et al.

(10) Patent No.: US 7,198,256 B2
(45) Date of Patent: Apr. 3, 2007

(54) RADIALLY DAMPING BUSH-TYPE RUBBER MOUNT

(75) Inventors: Alfred Tatura, Damme (DE); Claudia Hoping, Lohne (DE)

(73) Assignee: ZF Lemförder Metallwaren AG (DE)

( * ) Notice: Subject to any disclaimer, the term of this patent is extended or adjusted under 35 U.S.C. 154(b) by 691 days.

(21) Appl. No.: 10/363,144

(22) PCT Filed: Jun. 19, 2002

(86) PCT No.: PCT/DE02/02222

§ 371 (c)(1),
(2), (4) Date: Mar. 3, 2003

(87) PCT Pub. No.: WO03/008837

PCT Pub. Date: Jan. 30, 2003

(65) Prior Publication Data

US 2004/0056397 A1    Mar. 25, 2004

(30) Foreign Application Priority Data

Jul. 14, 2001  (DE) ................ 101 34 402

(51) Int. Cl.
*F16F 5/00*    (2006.01)
(52) U.S. Cl. ............ 267/140.13; 267/293; 267/140.12
(58) Field of Classification Search ............... 267/293, 267/140.11, 140.12, 140.13, 141.5
See application file for complete search history.

(56) References Cited

U.S. PATENT DOCUMENTS

| 4,756,514 A | 7/1988 | Kanda |
| 4,871,152 A | 10/1989 | Funahashi |
| 4,883,260 A | 11/1989 | Kanda |
| 5,013,012 A * | 5/1991 | Jouade ............... 267/140.12 |
| 5,092,565 A * | 3/1992 | Hamaekers et al. ... 267/140.12 |
| 5,190,269 A | 3/1993 | Ikeda et al. |
| 5,439,203 A * | 8/1995 | Hadano ............... 267/140.12 |
| 5,769,380 A * | 6/1998 | Hibi et al. ............ 267/141.2 |
| 5,967,668 A * | 10/1999 | Germano ................. 384/222 |
| 6,517,062 B2 * | 2/2003 | Kuwayama et al. ... 267/140.12 |

FOREIGN PATENT DOCUMENTS

| DE | 39 42 655 | 6/1991 |
| DE | 93 19 901 | 5/1994 |

(Continued)

*Primary Examiner*—Devon Kramer
(74) *Attorney, Agent, or Firm*—McGlew & Tuttle, PC (57) ABSTRACT

A bush-type rubber mount is provided, preferably a hydraulically damping rubber mount, with a, preferably tubular, metallic inner part, an elastomeric mount body surrounding the inner part and connected to it by vulcanization. An outer sleeve accommodates the inner part. The inner part has, in an axial section, two radially outwardly extending elevations located opposite each other on its circumference and are completely embedded in the elastomer. Two elastomer recesses extend in a kidney-shaped pattern in relation to the circumference of the mount body between the elevations and pass axially through the mount body. The two elastomer recesses are arranged in the elastomeric mount body near the inner part, so that the inner part standing free in relation to the outer sleeve in the area of the kidneys is connected to the mount body essentially only via the elevations on the mount body. A defined cardanic axis extending through the apices of the elevations is formed at right angles to the axis of the mount.

18 Claims, 5 Drawing Sheets

FOREIGN PATENT DOCUMENTS

| | | |
|---|---|---|
| DE | 43 07 559 | 9/1994 |
| DE | 43 20 643 | 2/1997 |
| DE | 44 38 931 | 9/1997 |
| DE | 198 07 949 | 12/1998 |
| DE | 196 13 912 | 2/2001 |
| EP | 0 995 928 | 4/2000 |
| GB | BG 2 322 427 | 8/1998 |
| JP | 2000120760 | 4/2000 |

* cited by examiner

RADIALLY DAMPING BUSH-TYPE RUBBER MOUNT

FIELD OF THE INVENTION

The present invention pertains to a radially damping bush-type rubber mount, which is preferably designed as a hydraulically damping rubber mount.

BACKGROUND OF THE INVENTION

Bush-type rubber mounts are used for many different purposes in automotive engineering. They are used there, e.g., to mount parts, e.g., for mounting the suspension arms for the wheel suspension. Depending on the particular application, the radial damping intended to be achieved with the rubber mount is frequently also supported by a hydraulically damping fluid, and corresponding hydraulic chambers for accommodating the damping agent are provided for this purpose in the mount body.

Such a hydraulically damping rubber mount is described, e.g., in DE 198 07 949 A1. According to the usual design, the mount described in the document comprises a tubular inner part, a sleeve surrounding the tubular inner part, and the elastomeric mount body, which is arranged in-between and is connected to the inner part by vulcanization. The mount described in the document has a special geometry. Two radially outwardly extending elevations are provided on the circumference of the inner part in an axial section. The mount body is vulcanized to these elevations, and these are walls in the form of elastic, hollow truncated cones in this case, which are supported on the elevations arranged in the axial center of the inner part and connected thus to the outer sleeve both axially as well as radially, i.e., extending quasi diagonally toward the outside relative to the axial direction. According to the explanations given in the document, it is said to be achieved with this comparatively complicated geometry that the radial damping of the mount is determined nearly exclusively by the damping agent circulating in the chambers between the elastic walls and the outer sleeve, while the damping action by the elastomer is basically negligible. Aside from the somewhat complicated geometry, there is a problem in the prior-art solution in that the radial damping characteristic of the mount is adversely affected by cardanic forces occurring. This can be attributed to the fact that a certain displacement of the damping agent from one chamber into the other takes place in the case of cardanic forces even without the effect of the radial forces to be damped due to the torsion or tilting of the inner part as well as the deformation of the elastomeric walls.

Another example for a hydraulic mount is described in DE 196 13 912 C2. The inner part has a radially outwardly extending elevation in the area of the axial center of the mount in this mount as well, at least according to one embodiment variant. The elevation surrounded by the elastomer and bordered by an additional element acts as an abutment with respect to radially acting forces in the mount described in the document. Due to the bordering with the element, the free surface of the abutment is reduced under load, so that the abutment hardens. Concerning the taking into account of cardanic stresses, it is only mentioned in the document that the bilateral foot areas of the abutments are not surrounded by the element in order to provide the possibility of deformations under torsional stress or cardanic stress in this area. However, a defined cardanic axis specifically absorbing the cardanic stress is not given as a result, so that the damping agent contained in the chamber is partially displaced in the case of cardanic stress in this mount as well. As a result, the radial damping action is affected by the cardanic forces in an undesired manner.

SUMMARY OF THE INVENTION

The object of the present invention is to design a radially damping bush-type rubber mount such that its radial damping action is very extensively uncoupled from cardanic forces.

The object is accomplished according to the present invention by a bush-type rubber mount, preferably hydraulically damping rubber mount, with a, preferably tubular, metallic inner part, an elastomeric mount body surrounding the inner part and connected to it by vulcanization. An outer sleeve accommodates the inner part. The inner part has, in an axial section, two radially outwardly extending elevations located opposite each other on its circumference and are completely embedded in the elastomer. Two elastomer recesses extend in a kidney-shaped pattern in relation to the circumference of the mount body between the elevations and pass axially through the mount body. The two elastomer recesses are arranged in the elastomeric mount body near the inner part, so that the inner part standing free in relation to the outer sleeve in the area of the kidneys is connected to the mount body essentially only via the elevations on the mount body. A defined cardanic axis extending through the apices of the elevations is formed at right angles to the axis of the mount.

The mount has, in the known manner, a preferably tubular metallic inner part, an elastomeric mount body connected thereto by vulcanization, as well as an outer sleeve accommodating the inner part and the mount body. Two elevations, which are located opposite each other on the circumference of the inner part, extend radially in the outward direction and are completely embedded in the elastomer. These two elevations are provided in an axial section on the inner part, which may have essentially a cylindrical shape but may also have another shape (e.g., with a parallelepipedic or oval cross section).

In addition, two elastomer recesses (kidneys), which extend in a kidney-shaped pattern relative to the circumference of the inner part between the elevations and pass axially through the mount body, are provided in the elastomeric mount body near the inner part. As a result, the inner part standing free in the area of the kidneys opposite the outer sleeve is bound to the mount body essentially only via the elevations, extending radially. At the same time, this geometric shape of the mount at right angles to the axis of the mount forms a defined cardanic axis extending through the apex of the elevations. Due to the design of this defined cardanic axis, the movements of the inner part are predetermined under cardanic stress. Besides, the rubber mount proper is uncoupled with respect to cardanic deflections occurring due to the quasi only punctiform connection of its inner part in relation to the rubber mount. As a consequence, the radial damping characteristic of the mount remains very extensively unaffected by the effect of cardanic forces.

The design shown consequently leads to a distribution of the moments occurring and acting on the inner part under cardanic load such that there is only a low internal moment in the area in which the inner part is connected to the mount body for a comparatively high external moment. Due to this resistance in the elastomer body in the area of the hydraulic chambers and the only low resistance of the elastomer body in the area in which it is connected to the inner part, the hydraulic chambers remain nearly unaffected under cardanic load, which means that tilting or buckling of the hydraulic chambers is avoided as a result and the function of the mount is preserved. Expanded possibilities of use are thus obtained for the mount, e.g., in respect to increased comfort in vehicles with great transverse deflections, e.g., off-road vehicles, pickups or vans.

Corresponding to a practical embodiment of the mount according to the present invention, the elevations on the inner part are formed in the area of the axial center of the mount, so that the cardanic axis intersecting the axis of the mount is also formed centrally. However, depending on the intended use, the elevations may also be displaced in the axial direction to one of the axial ends of the mount.

In an embodiment as a hydraulically damping rubber mount, recesses separated from each other by two axially extending partitions are provided on the outer circumference of the elastomeric mount body to form two chambers for a hydraulic damping agent, which are connected to one another via a channel in a liquid-carrying manner. The partitions of the chamber which support the mount body on the outer sleeve are arranged at an angle α relative to the circumference of the mount, opposite the elevations of the inner part. According to a possible embodiment, the angle α equals 45°, as a result of which, as will be explained later, an especially large working range is obtained for the mount in terms of the radial damping capacity. However, again depending on the intended use, the specific design is also such with respect to the angle α formed between the elevations and the chamber partitions that other angle conditions are also conceivable, depending on the tuning of the mount.

Corresponding to an especially advantageous variant of the mount according to the present invention, the elevations surrounded by the elastomer in the area of the connection of the inner part to the mount body, which connection is formed by the elevations, are designed with a convex surface in relation to the circumferential direction of the mount body or in the direction of the kidneys adjoining the elevations. In the case of use in which the mount is mounted upright, this results in a gutter effect, by which contaminants are prevented from being deposited in this area. Due to the convex design of the surface, any contaminants that may be present run off into the kidney-shaped recesses of the elastomeric mount body. To tune the characteristics, i.e., the radial damping characteristics, inserts, preferably ones made of metal, may also be enclosed in the elastomeric mount body in the mount according to the present invention. In addition, the tuning of the radial damping can be performed in a mount designed with hydraulic damping based on the length of the damping agent channel connecting the chambers to one another.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1A:
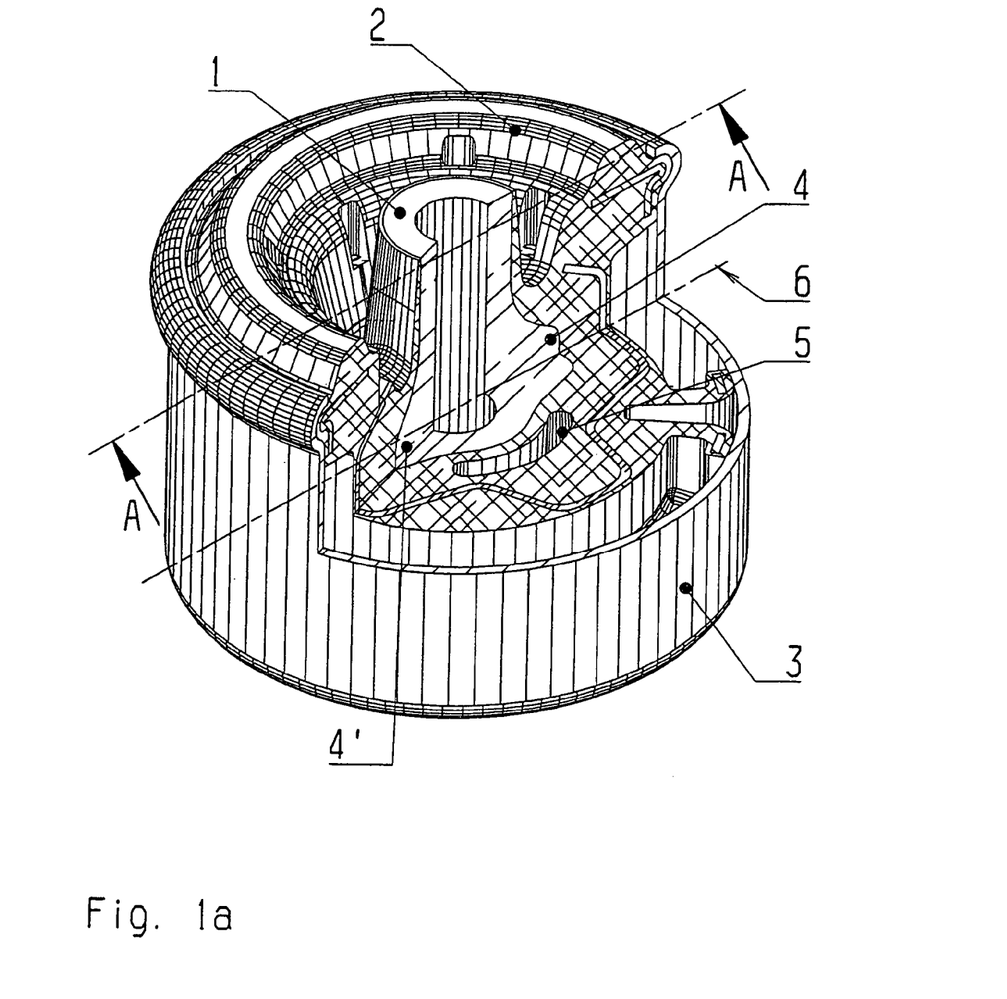
FIG. 1a is an isometric view of a bush-type rubber mount as a partial section.
Figure 1B:
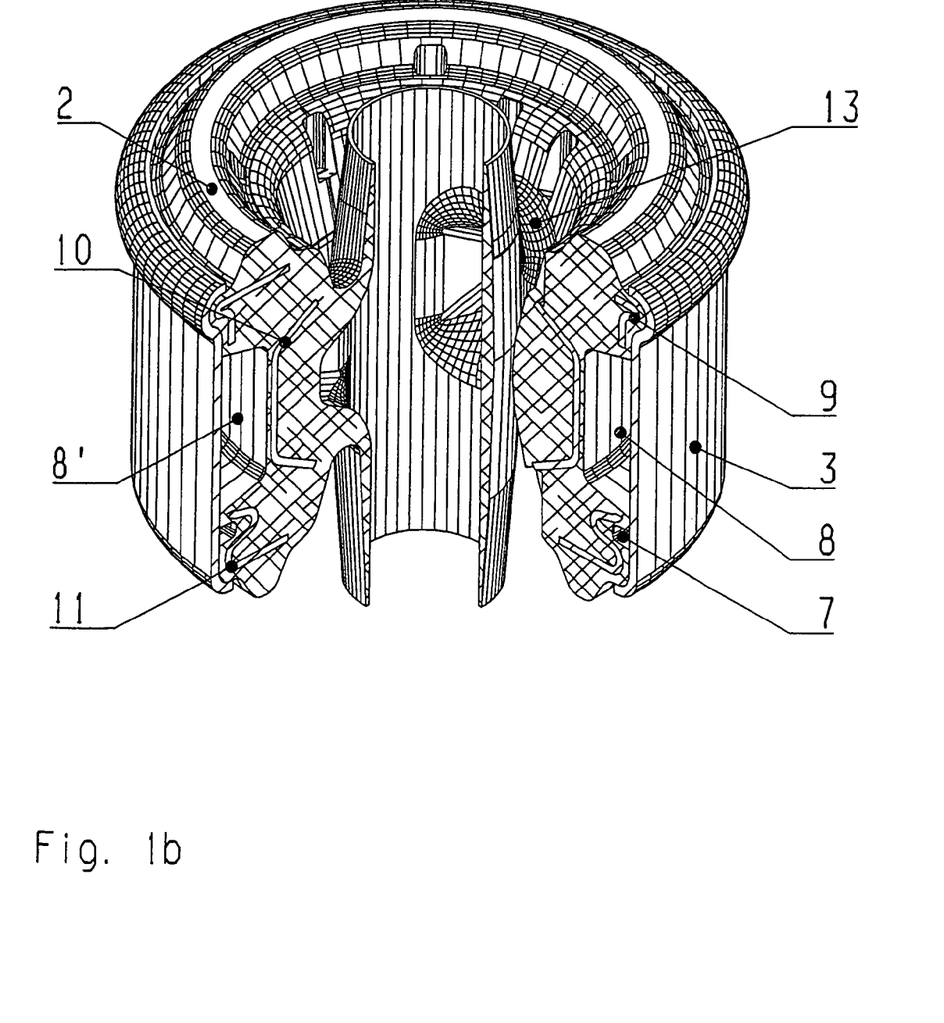
FIG. 1b is an isometric view of the bush-type rubber mount as a partial view, but without the inner part.
Figure 2:
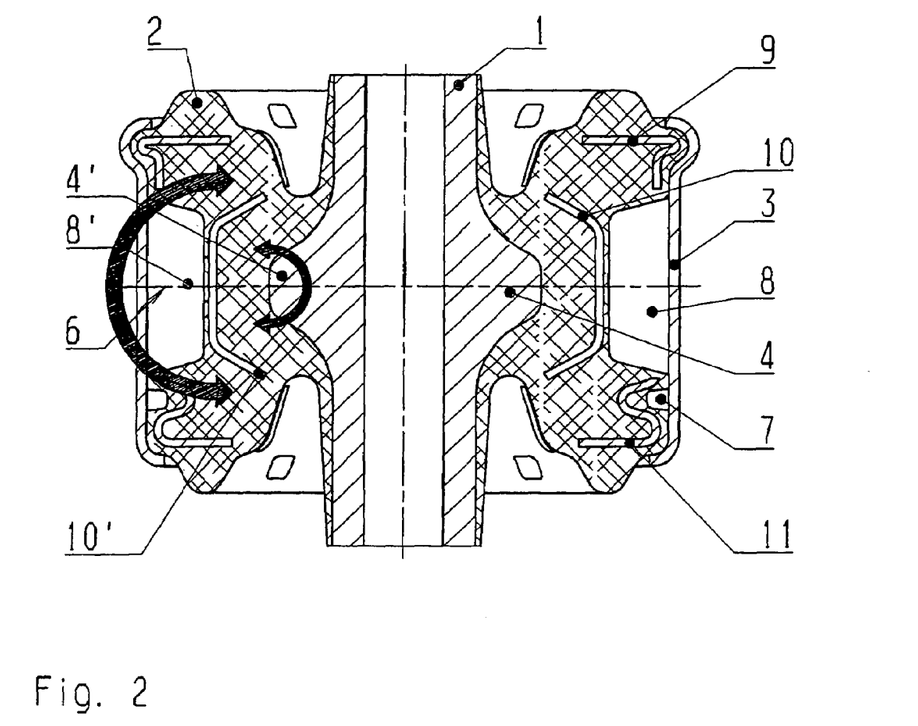
FIG. 2 is an axial sectional view through the mount according to the present invention according to FIG. 1 along line A—A, indicating the moments occurring under cardanic load.

Referring to the drawings in particular, FIGS. 1a and 1b show an isometric view of the mount according to the present invention, in which parts of the outer sleeve and of the mount body were cut out in the drawing to offer an insight into the interior of the mount. The mount shown in the example is designed as a hydraulically damping rubber mount. It comprises, in the known manner, a metallic, tubular inner part 1, the elastomeric mount body 2, which surrounds the inner part 1 and is connected thereto by vulcanization, and the outer sleeve 3 accommodating the aforementioned parts, the mount being shown without the inner part 1 in FIG. 1b. As can be recognized in FIG. 1a, but even more clearly in FIGS. 2 and 4, the inner part 1 has, approximately in the axial center, two elevations 4, 4', which are located opposite each other and extend radially outwardly. The elevations 4, 4' are completely enclosed by the elastomer 2, so that the view shown in FIG. 1b is obtained if the inner part 1 is imaginarily omitted. Furthermore, it can be recognized that, with the exception of the connections to the elevations 4, 4', the rest of the inner part 1 is arranged, freely standing, in the mount body 2. Chambers 8, 8' for accommodating a hydraulic damping agent are formed by recesses in the mount body 2, which can be better recognized in FIG. 1b, between the elastomeric mount body 2 and the outer sleeve 3. The chambers 8, 8' are connected to one another by a liquid-carrying channel 7 extending nearly completely around the entire mount, so that the damping agent can circulate between the chambers 8, 8'. The radial damping action of the mount results from the damping characteristic of the elastomer and the circulation of the hydraulic damping agent accommodated by the chambers 8, 8'. When radial loads occur, the damping agent is displaced from the chamber 8 or 8' located in the area of the load via the channel 7 into the respective other chamber 8' or 8 (mass damping). Due to the two-point suspension in the area of the elevations 4, 4' on the inner part 1, a defined cardanic axis 6, indicated in FIGS. 1a and 2, is formed. When cardanic stresses occur, the inner part 1 can move around this axis 6 (tilt around the axis 6), without the radial damping characteristic being affected hereby, e.g., due to a buckling of the damping agent chambers 8, 8' caused by the cardanic forces. The outer, hydraulically damping part of the mount is rather completely uncoupled from cardanic loads that occur. Thus, there is quasi a "mount-in-mount" arrangement. Displacement of the damping liquid accommodated by the chambers 8, 8' takes place only in the case of the introduction of radial forces. As can be recognized in the drawings, additional inserts 9, 10, 11, by which the radial damping characteristics can be tuned, are also enclosed by the elastomer in the mount being shown here as an example. The inserts 9, 10, 11 may have different shapes. For example, the inserts 9 and 11 may also be connected to one another in one piece, or the insert 10 may be formed by two separate parts.

The conditions occurring when cardanic loads occur are illustrated once again by the view in FIG. 2. FIG. 2 pertains to a sectional view of the mount according to FIG. 1a with a section along line A—A. When cardanically acting forces are introduced, the moment caused by them and acting on the inner part 1 is split in the manner illustrated in FIG. 2. It is achieved due to the selected geometry that there is a comparatively low internal moment for the high external moment. The elevations 4, 4' on the inner part 1 can be clearly recognized in FIG. 2. The design of the chambers 8, 8' and the course of the channel 7 connecting them can be clearly recognized once again as well.

Figure 3:
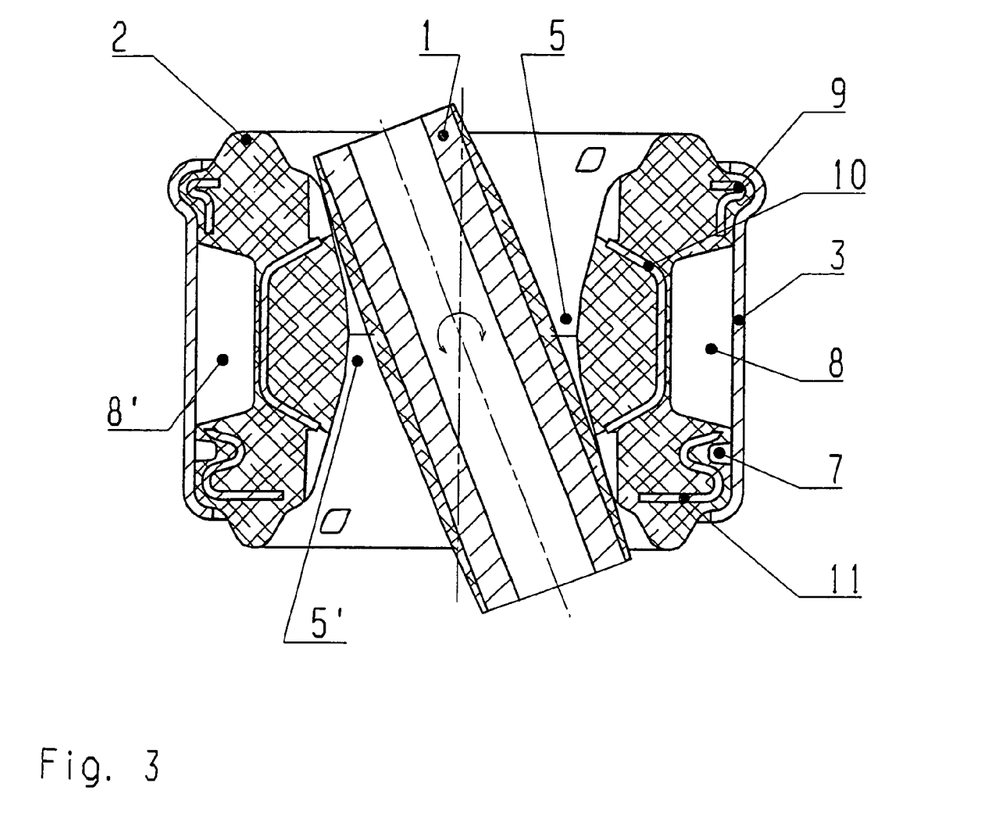
FIG. 3 is an axial sectional view of the mount according to FIG. 1 in a view at 90° to line A—A and under the effect of cardanic forces.

FIG. 3 shows the mount in yet another sectional view, in which the mount is shown under the effect of cardanic forces. FIG. 3 pertains to an axial section through the mount according to FIG. 1a with a section at 90° to the line A—A. It becomes clearly recognizable that a cardanic axis 6, around which the inner part 1 can move under cardanic load, is formed by the elevations 4, 4' and the connection of the inner part 1 to the mount body 2, which said connection is formed by the elevations (this axis extends into the plane of the drawing in the figure and is therefore not shown itself). However, it also becomes recognizable that the resulting slope of the inner part 1 against the axis of the mount does not affect the conditions in the mount body 2 and in the chambers 8, 8' at all, so that the radial damping remains basically completely unchanged.

Figure 4:
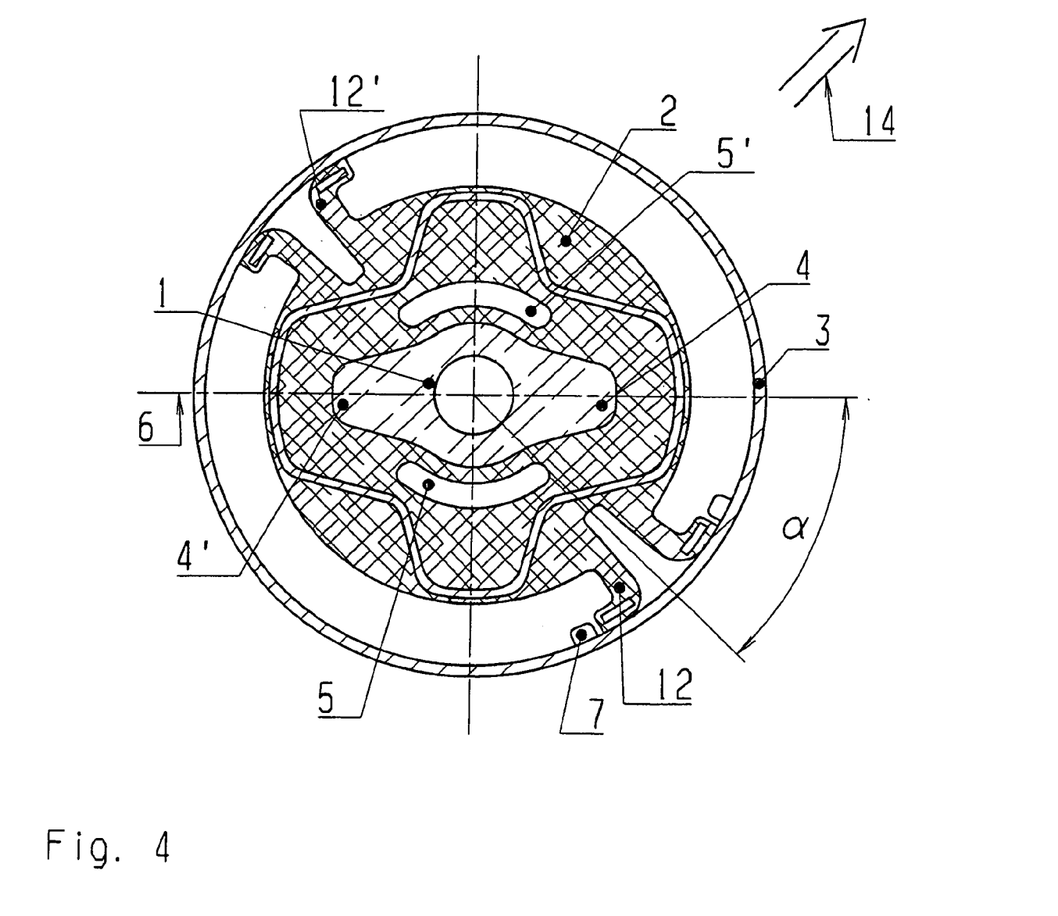
FIG. 4 is a radial sectional view through the mount according to FIG. 1.

The geometry is also clearly illustrated in FIG. 4, which shows a section extending radially through the mount according to FIG. 1a. The cardanic axis 6 is formed, on the one hand, due to the elevations 4, 4' and, on the other hand, due to the recesses 5, 5' of the elastomer, which are present simultaneously and extend close to the inner part 1 in a kidney-shaped pattern between the elevations 4, 4' in relation to the circumference of the mount. As is apparent from FIG. 3, the kidneys 5, 5' are continuous in the axial direction. This leads to the above-mentioned two-point connection with the formation of a cardanic axis 6 extending through the apices of the elevations 4, 4' as well as through the axis of the mount. In the example being shown, the ideal working line 14 of the mount extends at an angle of 45° to the cardanic axis 6 due to the selected arrangement of the connections 12, 12' with the outer sleeve 3, which also separate the chambers 8, 8' from one another at the same time. As a result, a working range of 90° is advantageously obtained for the mount. However, depending on the intended use and the specific stress associated therewith, the geometry may also be designed such that a different angle is formed between the elevations 4, 4' and the ideal working line 14.

As is apparent from FIG. 1b, the outer surface of the elevations 4, 4' surrounded by the elastomer has a convex shape in the circumferential direction. This leads to the advantage that contaminants, which could possibly be deposited in this area in case of vertical installation of the mount, can run off via the kidneys 5, 5'. The mount according to the present invention was explained in the figures shown in the case of a design as a hydraulically damping mount. However, the solution according to the present invention, which was shown here only based on the example of the hydraulically damping mount, may also be used in conventional rubber mounts, and the formulation "preferably hydraulically damping rubber mount" used herein does not represent a limitation in this respect.

While a specific embodiment of the invention has been shown and described in detail to illustrate the application of the principles of the invention, it will be understood that the invention may be embodied otherwise without departing from such principles.

The invention claimed is:

1. A radially damping bush-type rubber mount, the mount comprising:
    a tubular metallic inner part;
    an elastomeric mount body surrounding said inner part and connected to said inner part by vulcanization; and
    an outer sleeve accommodating said inner part and accommodating said mount body, said inner part having in an axial section two radially outwardly extending elevations located opposite each other on a circumference of said inner part and completely embedded in the elastomer mount body, and said elastomer mount body having kidney-shaped recesses extending axially through said mount body, said recesses being arranged in said elastomeric mount body near said inner part whereby said inner part standing free in relation to said outer sleeve, in an area of said kidney shaped recesses is connected to said mount body essentially only via said elevations on said mount body, and a defined cardanic axis extending through apices of said elevations is formed at right angles to an axis of the mount.

2. A radially damping bush-type rubber mount in accordance with claim 1, wherein said elevations are formed on said inner part in an area of the axial center of said mount.

3. A radially damping bush-type rubber mount in accordance with claim 1, wherein said mount is a hydraulically damping rubber mount with working chambers accommodating a hydraulic damping agent and a channel circulating said hydraulic damping agent between said working chambers, said channel being formed on an outer circumference of said elastomeric mount body between said elastomeric mount body and said outer sleeve and comprising two recesses separated from each other by axially extending partitions, said partitions supporting said mount body on said outer sleeve.

4. A radially damping bush-type rubber mount in accordance with claim 3, wherein said partitions are arranged at an angle (α) relative to a circumference of said mount in relation to said elevations of said inner part.

5. A radially damping bush-type rubber mount in accordance with claim 4, wherein said partitions are arranged at an angle (α) of 45° relative to the circumference of the mount in relation to said elevations of said inner part.

6. A radially damping bush-type rubber mount in accordance with claim 1, wherein the elastomer mount body enclosing said elevations has a convex outer contour in the direction of adjoining kidney shaped recesses man area of connections of said inner part to said mount body, the connections being formed by said elevations whereby a discharge groove is formed for contaminants being deposited in case of vertical installation.

7. A radially damping bush-type rubber mount in accordance with claim 1, further comprising additional inserts enclosed in said elastomeric mount body for tuning the characteristics of the mount.

8. A radially damping bush-type rubber mount in accordance with claim 3, wherein a radial damping characteristic of the mount can be set variably at a time of manufacture by changing a length of said channel connecting said chambers, said channel being provided with an opening to each said chamber.

9. A radially damping bush-type rubber mount, the mount comprising:

a metallic inner part extending in an axial direction, said inner part having an outer surface forming a first radially outwardly extending portion and a second radially outwardly extending portion, said first radially outwardly extending portion being located substantially opposite said second radially outwardly extending portion;

an elastomeric mount body surrounding said inner part with said first radially outwardly extending portion and said second radially outwardly extending portion completely embedded in elastomer of said elastomeric mount body, said elastomeric mount body being connected to said inner part by vulcanization essentially only via said first radially outwardly extending portion and said second radially outwardly extending portion on said mount body, said elastomeric mount body having kidney-shaped recesses located between said first radially outwardly extending portion and said second radially outwardly extending portion and extending axially through said mount body, said recesses being arranged in said elastomeric mount body near said inner part whereby said inner part is free in relation to said outer sleeve in an area of said kidney-shaped pattern recesses, and a defined cardanic axis extending through apices of said outwardly extending portions is formed at right angles to an axis of the mount; and an outer sleeve accommodating said inner part and accommodating said mount body.

10. A radially damping bush-type rubber mount in accordance with claim 9, wherein said first radially outwardly extending portion and said second radially outwardly extending portion are formed on said inner part in an area of an axial center of said mount.

11. A radially damping bush-type rubber mount in accordance with claim 10, wherein said mount is a hydraulically damping rubber mount with working chambers accommodating a hydraulic damping agent and a channel for moving hydraulic damping agent between said working chambers, said channel being formed on an outer circumference of said elastomeric mount body between said elastomeric mount body and said outer sleeve.

12. A radially damping bush-type rubber mount in accordance with claim 11, wherein partitions are arranged at an angle ($\alpha$) relative to a circumference of said mount in relation to said elevations of said inner part.

13. A radially damping bush-type rubber mount in accordance with claim 12, wherein said partitions are arranged at an angle ($\alpha$) of 45° relative to the circumference of the mount in relation to said outwardly extending portions of said inner part.

14. A radially damping bush-type rubber mount in accordance with claim 9, wherein the elastomer enclosing said first radially outwardly extending portion and said second radially outwardly extending portion has a convex outer contour in the direction of said adjoining kidney shaped recesses in an area of connections of said inner part to said mount body whereby a discharge groove is formed for deposited contaminants.

15. A radially damping bush-type rubber mount in accordance with claim 9, further comprising additional inserts enclosed in said elastomeric mount body for tuning the characteristics of the mount.

16. A radially damping bush-type rubber mount in accordance with claim 11, wherein a radial damping characteristic of the mount can be set variably at a time of manufacture by changing a length of said channel connecting said chambers, said channel being provided with an opening to each said chamber.

17. A radially damping bush-type rubber mount, the mount comprising:

a tubular metallic inner part having an outer surface with two radially outwardly extending elevations located opposite each other and each extending an axial distance;

an elastomeric mount body surrounding said inner part and connected to said inner part by vulcanization, said elevations each extending into said elastomer; and an outer sleeve accommodating said inner part and accommodating said mount body, said elastomeric mount body having arcuate-shaped recesses extending between said elevations and passing axially through said mount body, said recesses being arranged in said elastomeric mount body near said inner part whereby said inner part standing free in relation to said outer sleeve, in an area of said arcuate-shaped recesses is connected to said mount body essentially only via said elevations on said mount body, and a defined cardanic axis extending through the apices of said elevations is formed at right angles to an axis of the mount, said elastomeric mount body comprising working chambers and channels defined by said outer sleeve and said elastomeric mount body, said working chambers accommodating a hydraulic damping agent, said channels circulating said hydraulic damping agent between said working chambers, said channels comprising two recesses separated from each other by axially extending partitions of said mount body, said partitions supporting said mount body on said outer sleeve, said partitions being arranged at an angle of 45° relative to a circumference of said mount in relation to said elevations of said inner part, wherein said elastomer enclosing said elevations has a convex outer contour in the direction of said adjoining arcuate-shaped recesses in an area of connections of said inner part to said mount body, the connections being formed by said elevations whereby a discharge groove is formed for contaminants being deposited in case of vertical installation.

18. A radially damping bush-type rubber mount, the mount comprising:

a metallic inner part extending in an axial direction, said inner part having an outer surface forming a first radially outwardly extending portion and a second radially outwardly extending portion, said first radially outwardly extending portion being located substantially opposite said second radially outwardly extending portion;

an elastomeric mount body surrounding said inner part with said first radially outwardly extending portion and said second radially outwardly extending portion completely embedded in elastomer of said elastomeric mount body, said elastomeric mount body being connected to said inner part by vulcanization essentially only via said first radially outwardly extending portion and said second radially outwardly extending portion on said mount body, said elastomeric mount body having kidney-shaped recesses provided between said first radially outwardly extending portion and said second radially outwardly extending portion and extending axially through said mount body, said recesses being arranged in said elastomeric mount body near said inner part whereby said inner part is free in relation to an outer sleeve in an area of said kidney-shaped recesses, and a defined cardanic axis extending through apices of said outwardly extending portions is formed at right angles to an axis of the mount, said mount body is a hydraulically damping rubber mount with working chambers accommodating a hydraulic damping agent and a channel for moving hydraulic damping agent between said working chambers, said channel being formed on an outer circumference of said elastomeric mount body between said elastomeric mount body and said outer sleeve, said elastomer enclosing said first radially outwardly extending portion and said second radially outwardly extending portion has a convex outer contour in the direction of said adjoining kidney-shaped recesses in an area of connections of said inner part to said mount body whereby a discharge groove is formed for deposited contaminants, a radial damping characteristic of the mount can be set variably at a time of manufacture by changing a length of said channel connecting said chambers, said channel being provided with an opening to each said chamber; and said outer sleeve accommodating said inner part and accommodating said mount body.

* * * * *